United States Patent
Seibel et al.

(10) Patent No.: US 6,720,748 B1
(45) Date of Patent: Apr. 13, 2004

(54) STATIC COMMISSIONING METHOD AND APPARATUS TO IDENTIFY RATED FLUX CURRENT

(75) Inventors: Brian J. Seibel, Grafton, WI (US); Russel J. Kerkman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/365,216

(22) Filed: Feb. 12, 2003

(51) Int. Cl.$^7$ .................................................. H02P 7/00
(52) U.S. Cl. ........................ 318/432; 318/434; 318/727; 318/804; 318/807
(58) Field of Search ........................... 318/727, 432, 318/804–807, 434

(56) References Cited

U.S. PATENT DOCUMENTS

| | | | |
|---|---|---|---|
| 3,863,121 A | * | 1/1975 | Rettig .......................... 318/801 |
| 4,453,116 A | * | 6/1984 | Bose ............................ 318/727 |
| 5,032,771 A | | 7/1991 | Kerkman et al. |
| 5,481,168 A | * | 1/1996 | Mutoh et al. ................ 318/432 |
| 5,610,806 A | | 3/1997 | Blasko et al. |
| 5,689,169 A | | 11/1997 | Kerkman et al. |
| 5,739,664 A | * | 4/1998 | Deng et al. .................. 318/808 |
| 5,936,377 A | * | 8/1999 | Blaschke et al. ........... 318/807 |

* cited by examiner

*Primary Examiner*—Rina I Duda
(74) *Attorney, Agent, or Firm*—Quarles & Brady; William R. Walbrun

(57) ABSTRACT

A method for use with an adjustable frequency controller to deliver current to an electromagnetic load including a stator and a rotor, the method for identifying a flux current estimate and comprising the steps of (a) identifying a rated torque value; (b) providing an initial q-axis current estimate; (c) using the q-axis current estimate to identify a d-axis current estimate; (d) mathematically combining the d-axis current estimate and the q-axis current estimate to identify a torque estimate; (e) comparing the rated torque value to the torque estimate; (f) where the torque estimate is similar to the rated torque value skipping to step (i); (g) altering the q-axis current estimate; (h) repeating steps (c) through (f); and (i) storing the d-axis and q-axis current estimates as flux and torque current values for subsequent use.

21 Claims, 4 Drawing Sheets

STATIC COMMISSIONING METHOD AND APPARATUS TO IDENTIFY RATED FLUX CURRENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is motor controllers and more specifically field oriented controllers and a method and apparatus for identifying a rated flux current estimate for an electromagnetic machine during a static commissioning procedure.

A typical three-phase induction motor controller is provided with three phases of electrical voltage and uses the three phases to produces a rotating magnetic stator field within the stator cavity of a motor linked thereto. The stator field induces (hence the label "induction") a rotor current within a rotor mounted in the stator cavity. The rotor current in turn generates a rotor field within the cavity. The rotor field interacts with the stator field (e.g., is attracted to or repelled by) and causes the rotor to rotate.

The magnitude of the attractive force between the rotor and stator fields is generally referred to as torque. Where the force between the two fields is high, the torque is high and the force that can be applied to a load is high. Where the attractive force between the stator and rotor fields is low, the torque is low and the force that can be applied to a load is also relatively low.

To a first approximation, the torque and speed of an induction motor may be controlled by changing the frequency of the driving voltage and thus the angular rate of the rotating stator field. Generally, for a given torque, increasing the stator field rate will increase the speed of the rotor (which follows the stator field). Alternatively, for a given rotor speed, increasing the frequency of the stator field will increase the torque by increasing the slip, that is, the difference in speed between the rotor and the stator field. An increase in slip increases the rate at which flux lines are cut by the rotor, increasing the rotor-generated field and thus the force or torque between the rotor and stator fields.

Referring to FIG. 1, the rotating phasor 14 of a stator magneto motive force ("mmf") will generally form some angle a with respect to the phasor of rotor flux 18. The torque generated by the motor is proportional to the magnitudes of these phasors 14 and 18 but is also a function of the angle α between the two phasors 14 and 18. The maximum torque is produced when phasors 14 and 18 are at right angles to each other (e.g., α=90°) whereas zero torque is produced when phasors 14 and 18 are aligned (e.g., α=0°). The mmf phasor 14 can be usefully decomposed into a torque producing component 15 perpendicular to the phasor 18 and a flux component 17 parallel to rotor flux phasor 18.

Components 15 and 17 of the stator mmf are proportional, respectively, to two stator currents $i_{qe}$, a torque producing current, and $i_{de}$, a flux producing current, which may be represented by orthogonal vectors in the rotating frame of reference (synchronous frame of reference) of the stator flux having slowly varying magnitudes. The subscript "e" is used to indicate that a particular quantity is in the rotating frame of stator flux.

Accordingly, in controlling an induction motor, it is generally desired to control not only the frequency of the applied voltage (hence the speed of the rotation of the stator flux phasor 14) but also the phase of the applied voltage relative to the current flow and hence the division of the currents through the stator windings into the $i_{qe}$ and $i_{de}$ components. Control strategies that attempt to independently control the currents $i_{qe}$ and $i_{de}$ are generally referred to as field oriented control strategies ("FOC").

Generally, it is desirable to design field-oriented controllers that are capable of driving motors of many different designs and varying sizes. Such versatility cuts down on research, development, and manufacturing costs and also provides easily serviceable controllers.

While multi-purpose controllers have reduced manufacturing costs, unfortunately versatile controllers have complicated commissioning processes required to set up a controller to control a motor. Specifically, to control a motor most efficiently, the controller has to be programmed with certain motor unique operating parameters. Because manufacturers of multi-purpose controllers cannot know the specific operating parameters of the motor with which their controllers will be used, the manufacturers cannot set the parameters for the end users—the users have to set the parameters themselves.

After an electromechanical machine (e.g., a motor) has been manufactured, the machine is typically characterized by several maximum recommended or most efficient operating characteristics (e.g., rated operating current value, a rated voltage value, a rated rotational speed, a rated horsepower, etc.) that are determinable through various tests and procedures. These rated values are determined by manufacturers and are usually provided to end users so that the users can match machine capabilities with applications (e.g., expected loads, speeds, currents, voltages, etc.). Many of these rated values can also be used to commission a motor controller to control the associated motor.

Other operating characteristics cannot be determined until after a motor is linked to a load and, thereafter, are identified by performing some commissioning procedure. For example, a stator resistance $r_s$ and a leakage inductance $L_\sigma$ are determinable via various commissioning procedures.

One other operating parameter that is necessary for efficient and effective FOC is the rated flux or d-axis current value (and related q-axis current value) which depends in part on specific motor design and other operating parameters and hence cannot be provided by a controller manufacturer. To identify a rated flux current value, commissioning procedures have been developed that require rotation of the motor rotor while different current levels are injected into the motor windings so that a flux saturation curve can be generated. In some applications rotor rotation prior to motor operation is unacceptable.

Where rotor rotation prior to operation is unacceptable, some processes have been devised for estimating a saturation curve while the motor is at stand still. Unfortunately, the commissioning processes that are used to generate saturation curves while a motor rotor is stationary are not very accurate and the end result is typically poor motor starting performance.

Thus, there is a need for a process whereby a relatively accurate rated flux estimate can be identified during a static commissioning procedure (i.e., prior to motor rotation/operation).

BRIEF SUMMARY OF THE INVENTION

It has been recognized that several of the rated motor operating parameters that are typically provided by motor manufacturers and several other operating parameters that can be derived during static commissioning procedures can be used in an iterative fashion to identify a relatively accurate flux current estimate for use in starting a motor from standstill. More specifically, a stator resistance value $r_s$ and a leakage inductance value $L_\sigma$ can be identified using stationary commissioning procedures. Thereafter, a motor torque current (i.e., a q-axis current) can be assumed and used along with the stator resistance $r_s$ and leakage inductance $L_\sigma$ values and rated motor voltage, rated current and rated speed to identify a flux value aligned with the d-axis. Next, the flux value and a set of the other parameters identified above can be mathematically combined to generate a torque estimate. Continuing, a rated motor speed and rated horse power can be used to identify a motor rated torque value. The torque estimate is compared to the rated torque estimate and the q-axis motor torque current assumption is altered as a function of the difference between the estimated and rated torques.

The process described above is repeated until the torque estimate is within a tolerable range of the rated torque value. Once the torque estimate is within the tolerable range of the rated torque value, the d and q-axis current values are stored as rated flux and torque current values. In at least some embodiments convergence on the rated torque value expedited by altering the q-axis torque current assumption (i.e., the q-axis current value) as a function of the magnitude of the difference between the torque estimate and the rated torque value.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

A. Theory

Figures 1, 4:
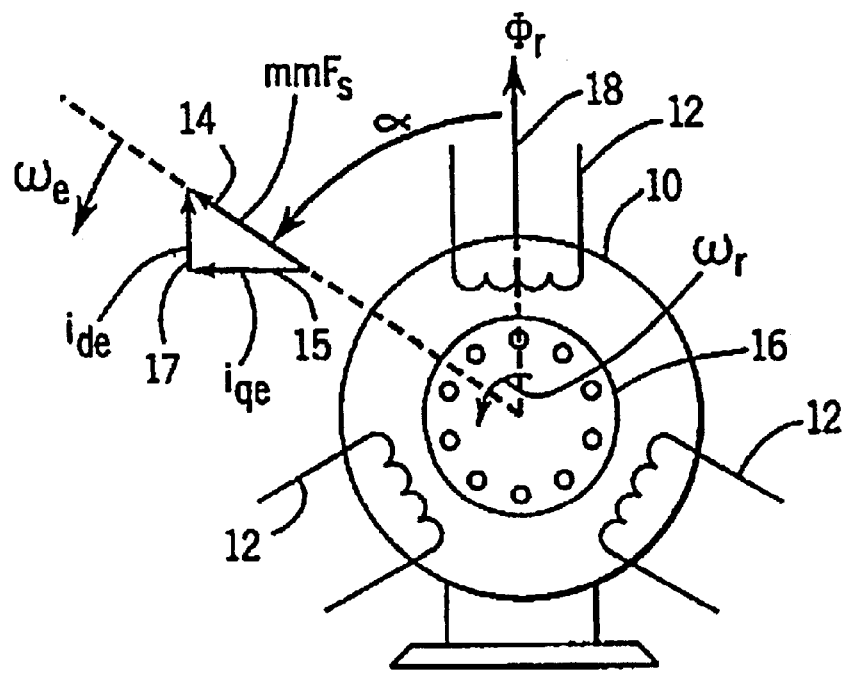
FIG. 1 is a cross-sectional schematic view of an induction motor showing instantaneous locations of a rotor flux, a stator mmf and the torque and flux components of the stator mmf.
FIG. 4 is a sub-process that may be substituted for a portion of the process of FIG. 3.

There are several fundamental equations that are routinely used in the FOC art to describe AC motors. The fundamental equations can be used in conjunction with rated values and operating parameters that can be derived from rated values and during static commissioning procedures to identify the flux current in an iterative fashion. More specifically, after a rated torque for a specific motor is identified, a relatively high torque producing q-axis current value is assumed and an estimated torque for a specific motor that would be produced if the high q-axis torque were used to drive the motor can be identified. Next, the torque estimate and rated torque are compared and the q-axis current estimate is altered until the resulting torque estimate is similar to the rated torque value. One of the intermediate values identified during the torque estimating process is the rated flux current value. Once the torque estimate is similar to the rated torque value, the flux current or d-axis current value is stored for subsequent use.

Several fundamental AC motor equations form the basis for identifying the rated flux current value for a specific motor according to the present invention. The fundamental equations are as follows. First, a rated motor torque $T_r$ can be expressed as:

$$T_r = (5250 HP_r)/(0.739 RPM_r) \qquad (1)$$

Where $HP_r$ is a rated horse power value and $RPM_r$ is a rated rotor speed value in rotations per minute.

Second, the electromagnetic torque equation for an AC motor can be expressed as:

$$T_e = 0.75 P(\lambda_{de} i_{qe} - \lambda_{qe} i_{de}) \qquad (2)$$

where:

P=# motor poles;

$i_{qe}$=motor current aligned with the q-axis, typically reflecting motor torque;

$i_{de}$=motor current aligned with the d-axis, typically motor flux;

$\lambda_{qe}$=motor flux aligned with the q-axis; and $\lambda_{de}$=motor flux aligned with the d-axis.

For rotor FOC, the flux component $\lambda_{qe}$ can be redefined in steady state as follows:

$$\lambda_{qe} = L_\sigma i_{qe} \qquad (3)$$

where $L_\sigma$=transient inductance

Third, as well known in the FOC art, the production of any given set of currents $i_{qe}$ and $i_{de}$ requires that the stator be excited with voltages $V_{qe}$ and $V_{de}$ as follows:

$$v_{qe} = r_s i_{qe} + \omega_e \lambda_{de} \qquad (4)$$

$$v_{de} = r_s i_{de} - \omega_e \lambda_{qe} \qquad (5)$$

where $v_{qe}$, $v_{de}$=terminal voltages;

$r_s$=stator resistance; and $\omega_e$=electrical field frequency.

Fourth, the d-axis current and q-axis voltage components $i_{de}$ and $v_{qe}$, respectively, can be expressed by the following equations:

$$i_{de} = (i_r^2 - i_{qe}^2)^{1/2} \qquad (6)$$

$$v_{qe} = (v_r^2 - v_{de}^2)^{1/2} \qquad (7)$$

where $i_r$ is the rated motor current;

$v_r$ is the rated motor voltage.

Prior to starting the inventive iterative commissioning procedure, five required operating characteristics include the rated current $i_r$, the rated voltage $v_r$, the rated torque $T_r$, the stator resistance value $r_s$ and the transient inductance value $L_\sigma$. The rated current $i_r$ and rated voltage $v_r$ values are typically provided by the motor manufacturer (e.g., are referred to as "name plate" values).

In addition, motor manufacturers routinely provide a rated or name plate horse power value $HP_r$ and a rated motor speed value $RPM_r$. The rated horse power $HP_r$ and speed $RPM_r$ values can be plugged into Equation 1 above to identify the rated torque value $T_r$.

The industry has developed several processes to determine the stator resistance $r_s$ and the transient inductance $L_\sigma$ values during static commissioning procedures. For example, U.S. Pat. No. 5,689,169 which is titled "Transient Inductance Identifier for Motor Control" teaches one method for determining the leakage inductance. Hereinafter it will be assumed that each of the stator resistance $r_s$ and the transient inductance $L_{\sigma 4}$ values have been determined.

With the stator resistance $r_s$, transient inductance $L_\sigma$, rated voltage $v_r$, rated current $i_r$ and rated torque $T_r$ values determined, the following steps can be performed to identify the rated d-axis flux current value $i_{de}$ for the motor.

First, a relatively high torque producing q-axis current value $i_{qe}$ is assumed so that the resulting estimated torque value $T_{est}$ should be extremely high. For instance, the q-axis current value $i_{qe}$ may initially be assumed to be equal to or slightly less than the rated motor current $i_r$. Next, Equation 6 above is used to identify the d-axis current $i_{de}$ and Equation 7 is used to identify a q-axis voltage value $v_{qe}$. Continuing, Equation 4 is rewritten as:

$$\lambda_{de} = (v_{qe} - r_s i_{qe})/(\omega_e) \tag{8}$$

The d-axis flux component $\lambda_{de}$ is determined by solving Equation 8. Next, Equations 2 and 4 are combined to yield the following equation:

$$T_e = 0.75 P(\lambda_{de} i_{qe} - L_\sigma i_{qe} i_{de}) \tag{9}$$

Equation 9 is solved to determine the torque estimate value $T_{est}$. Torque estimate value $T_{est}$ is then compared to rated torque value $T_r$ (see again Equation 1 above). Where torque estimate value $T_{est}$ is similar to rated torque value $T_r$, the flux current value $i_{de}$ and the torque current value $i_{qe}$ used in Equation 10 are stored as a relatively accurate estimates for subsequent use. Where the torque estimate value $T_{est}$ is substantially greater than the rated value $T_r$, the torque producing q-axis current estimate $i_{qe}$ value is reduced and the calculations above are repeated.

In some embodiments reductions in the q-axis current value $i_{qe}$ may be linked to the magnitude of the difference between the torque estimate and the rated torque value so that the flux current converges on an acceptable and relatively accurate value more quickly. For example, in at least one embodiment a torque tolerance value is identified and the torque current value reduction is tied to the torque tolerance value where, each time through the torque estimation loop, if the difference between the torque estimate value and the rated torque value is less than the tolerance value, the tolerance value is divided by a factor of 2. Here, the loop may be repeated until the torque tolerance value is less than a minimum tolerance value $T_{min}$ which is a small fraction of the rated torque value. For instance, the initial torque tolerance value may be 25% of the rated torque value and the minimum tolerance value $T_{min}$ may be 2.5% of the rated torque value.

B. Hardware and Method

Figure 2:
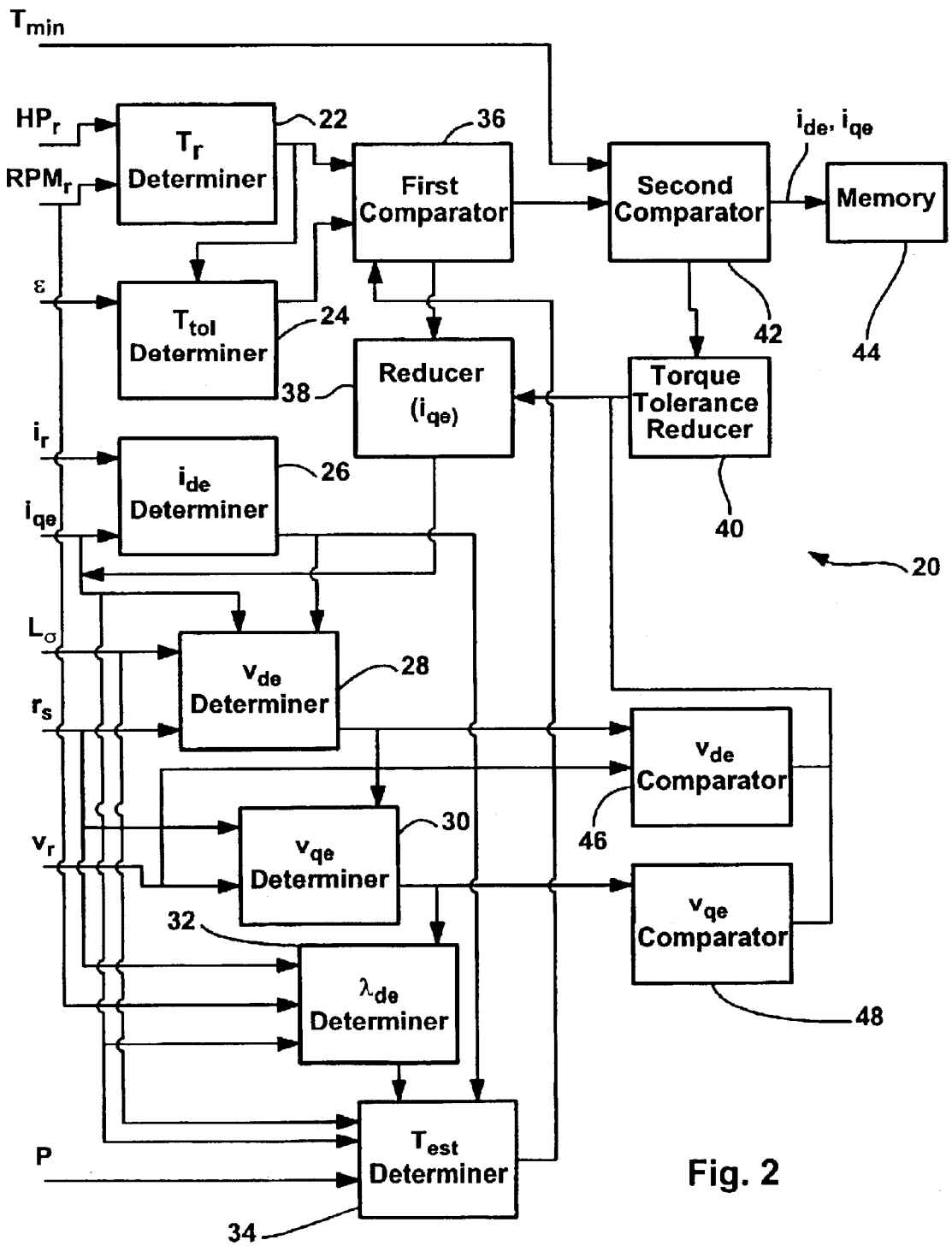
FIG. 2 is a schematic diagram illustrating processor modules assembled to perform an inventive method according to the present invention.

Referring now to the drawings and, more specifically, referring to FIG. 2, therein is illustrated a schematic diagram of processor modules corresponding to functions that are performed according to at least one embodiment of the present invention. While illustrated as separate processor modules, it should be appreciated that the modules in FIG. 2 may be comprised in a single microprocessor that can perform the inventive iterative algorithm to be described herein for identifying a rated motor flux current value and a corresponding rated torque value. The processor modules in FIG. 2 include a rated torque determiner 22, a torque tolerance determiner 24, a d-axis or flux current component determiner 26, a d-axis voltage determiner 28, a q-axis voltage determiner 30, a d-axis flux determiner 32, a torque estimate determiner 34, a first comparator 36, a q-axis current reducer 38, a d-axis voltage comparator 46, a q-axis voltage comparator 48, a second comparator 42, a torque tolerance reducer 40 and a memory 44.

Figure 3:
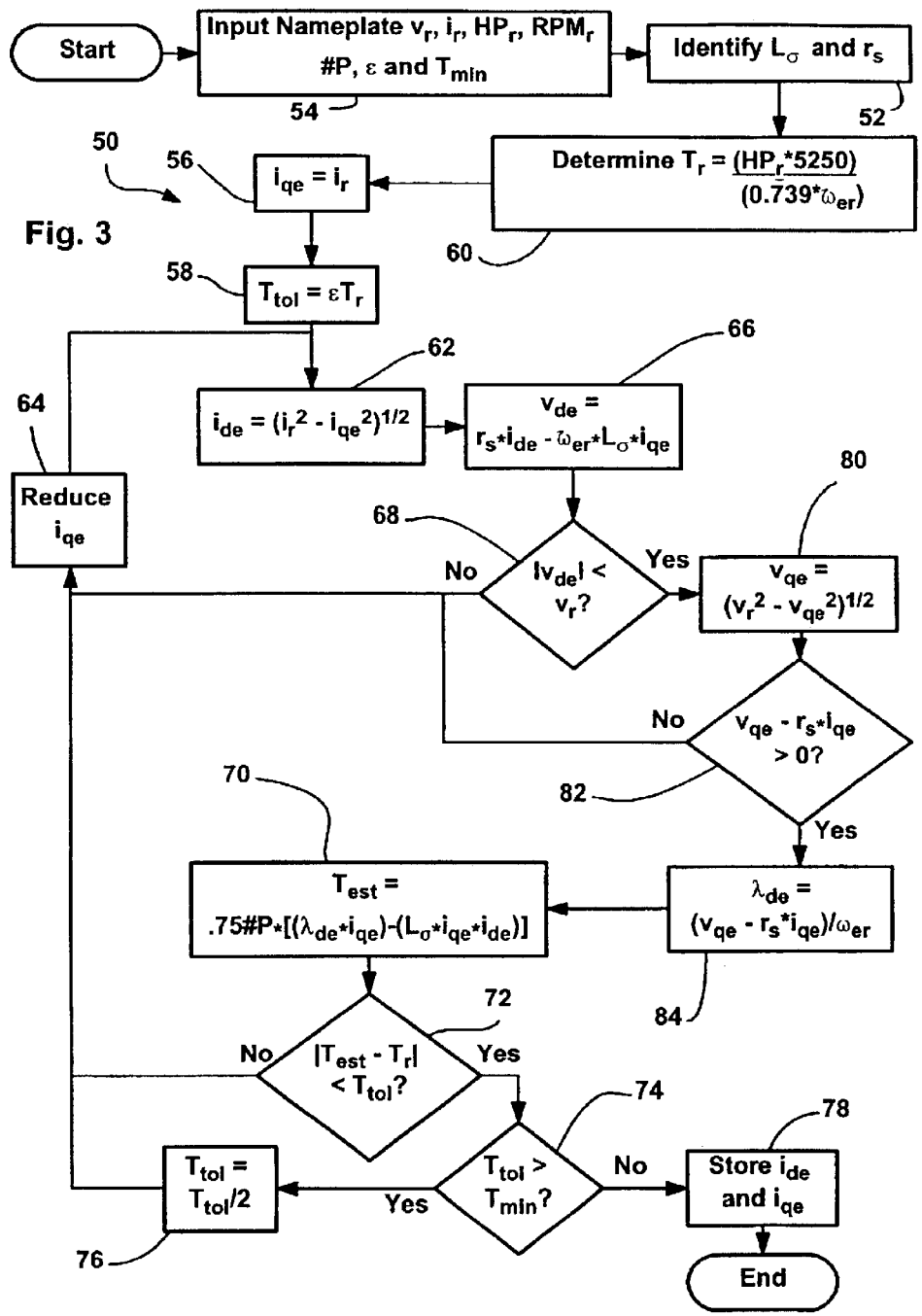
FIG. 3 is a flow chart illustrating one method according to the present invention.

Referring also to FIG. 3, a method 50 performed by the processor modules illustrated in FIG. 2 is schematically represented. FIGS. 2 and 3 will be described together. Beginning at block 54, the nameplate or rated horsepower value $HP_r$ and rated motor speed $RPM_r$ are provided to the rated torque determiner 22. In addition, at block 54, the rated current $i_r$ and the rated voltage $v_r$ are provided to the d-axis current determiner and the q-axis voltage determiner 26 and 30, respectively. Moreover, an initial torque tolerance multiplier $\epsilon$ is provided by a system user or by a preprogrammed processor to the torque tolerance determiner 24 while the number of poles P that characterize the specific motor for which the controller is to be provided is commissioned to the torque estimate determiner 34. At block 52 in FIG. 3, a static commissioning procedure like any of the several procedures known in the prior art is used to identify each of a transient inductance value $L_\sigma$ and a stator resistance value $r_s$.

Referring still to FIGS. 3 and 4, at block 60, the rated torque determiner 22 solves Equation 1 above to identify the rated torque value $T_r$. The rated torque value $T_r$ is provided to each of the first comparator 36 and the torque tolerance determiner 24. At block 56, a q-axis current value $i_{qe}$ is assumed to be relatively large. In this case, the q-axis current value $i_{qe}$ is assumed to be equal the rated current value $i_r$. At block 58, the torque tolerance determiner 24 multiplies the scalar $\epsilon$ by the rated torque value $T_r$ to generate a torque tolerance value $T_{tol}$ which is provided to first comparator 36.

Next, at block 62, a d-axis or flux current value $i_{de}$ is determined by solving Equation 6 above and the flux current $i_{de}$ is provided to each of the d-axis voltage determiner 28 and the torque estimate determiner 34. At block 66, the d-axis voltage determiner 28 solves Equation 5 above where value $L_\sigma i_{qe}$ is substituted for the q-axis flux value $\lambda_{qe}$ (see again Equation 3). The d-axis voltage value identified by determiner 28 is provided to each of the q-axis voltage determiner 30 and to the d-axis voltage comparator 46.

At block 68, the d-axis voltage comparator 46 compares the absolute value of the d-axis voltage value to the rated voltage $v_r$. Where the absolute value of the d-axis voltage $v_{de}$ is greater than the rated voltage $v_r$, comparator 46 causes q-axis current reducer 38 to reduce the value of the q-axis current by some quantum and control passes back up to determiner 26 where the modules described above repeat the process with a reduced q-axis current value. The q-axis current reduction step is represented by block 64 in FIG. 3. Where the absolute value of the d-axis voltage $v_{de}$ is less than the rated voltage $v_r$, control passes to block 80 where the q-axis voltage determiner 30 solves Equation 7 above to identify the q-axis voltage value $v_{qe}$. The q-axis voltage value $v_{qe}$ is provided to each of the q-axis voltage comparator 48 and to the d-axis flux determiner 32.

At decision block 82, the q-axis voltage comparator 48 determines whether or not the sum $v_{qe}-r_s i_{qe}$ is greater than zero. Where the sum $v_{qe}-r_s i_{qe}$ is not greater than zero, comparator 48 again causes q-axis current reducer to reduce the q-axis current value and begin the process described above with a different and smaller q-axis current value. However, at block 82, where sum $v_{qe}-r_s i_{qe}$ is greater than zero, control passes to block 84 where the d-axis flux determiner 32 determines the d-axis flux value $\lambda_{de}$ by solving Equation 8 above. Determiner 32 provides the d-axis flux value $\lambda_{de}$ to torque estimate determiner 34. Estimate determiner 34 solves Equation 9 at block 70 and provides a torque estimate $T_{est}$ to first comparator 36.

First comparator 36 compares the difference between the torque estimate $T_{est}$ and the rated torque value $T_r$ to the torque tolerance value $T_{tol}$ and, where the difference is greater than the torque tolerance value $T_{tol}$, control passes to q-axis torque reducer 38 which, again, reduces the q-axis torque value $i_{qe}$ and causes the process as described above to be repeated. Where the difference value at block 72 is less than the torque tolerance value $T_{tol}$, control passes to second comparator 42 which compares the torque tolerance value $T_{tol}$ to the minimum torque tolerance value $T_{min}$ (e.g., 2.5% of the rated torque value). Where the torque tolerance value $T_{tol}$ is greater than the torque tolerance minimum value $T_{min}$ control passes to torque tolerance reducer 40 which, as its label implies, reduces the torque tolerance value $T_{tol}$ at block 76.

In the example illustrated, the torque tolerance value $T_{tol}$ is reduced by dividing that value by 2 at block 76. After the torque tolerance reducer 40 reduces the torque tolerance value, control again passes to the q-axis current reducer 38 which again reduces the q-axis current value prior to causing the process described above to be repeated. At block 74, when the torque tolerance value $T_{tol}$ is less than or equal to the torque tolerance minimum value $T_{min}$, second comparator 42 stores the d and q-axis current values $i_{de}$ and $i_{qe}$, respectively, in memory 44 for subsequent use.

Referring now to FIG. 4, an exemplary q-axis current reduction step 90 which may be substituted for block 64 in FIG. 3 is illustrated. Generally, the reduction step includes multiplying an instantaneous q-axis current value $i_{qe}$ by the sum $$\left(1 - \frac{T_{tol}}{T_r}\right).$$

In this manner, the q-axis current value $i_{qe}$ is reduced to a greater extent when the torque tolerance value $T_{tol}$ is large and, as the torque tolerance value $T_{tol}$ is reduced and approaches the torque tolerance minimum value $T_{min}$, the reduction in q-axis current value $i_{qe}$ is similarly reduced. By tying the reduction in q-axis current to the magnitude of the torque tolerance value, the algorithm converges more rapidly on the rated flux current value $i_{de}$ as desired.

C. Simulation and Results

Figure 5:
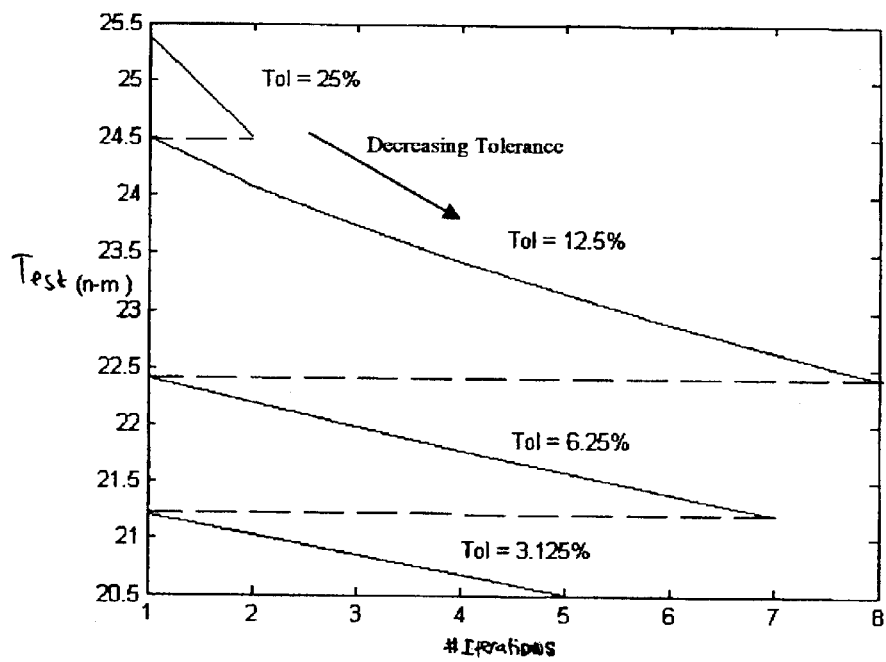
FIG. 5 is a graph illustrated tolerance modifications as an estimated torque value converges on a rated torque value according to one inventive embodiment.

Various simulations have been performed using the inventive method and apparatus and the initial results have been encouraging. FIG. 5 illustrates how the torque tolerance value is reduced during loop iterations until a minimum tolerance level is reached. In the example, the initial torque tolerance value is 25% of the rated value. As illustrated, after two iterations the estimated torque value $T_{est}$ is within 25% of the rated value and therefore the tolerance value is divided by 2 (e.g., $T_{tol}$=12.5%). After an additional 8 iterations the estimate value $T_{est}$ is within 12.5% of the rated value and thus the tolerance value is again divided to 2 (e.g., $T_{tol}$= 6.25%). The process is repeated until, after 12 additional iterations, the tolerance value $T_{tol}$ is reduced to a point below the 2.5% value and the process is completed.

Figure 6:
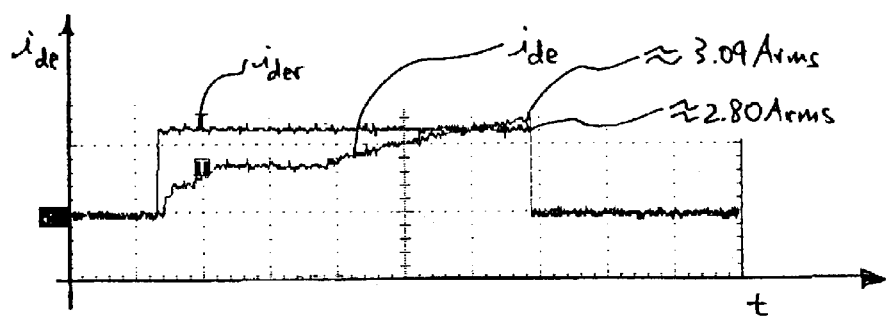
FIG. 6 is a graph illustrating the results of a static commissioning procedure according to the present invention and a flux current value identified via a rotational commissioning test as a point of reference.

In FIG. 6, a flux current value $i_{de}$ identified via an exemplary static commissioning procedure according to the present invention is illustrated along with a flux current value $i_{der}$ identified via a rotational commissioning test. The final value identified using the static commissioning flux methodology was 3.05 Arms which, after approximately 50 iterations was very close to the rotational commissioning result of approximately 2.8 Arms It should be understood that the methods and apparatuses described above are only exemplary and do not limit the scope of the invention, and that various modifications could be made by those skilled in the art that would fall under the scope of the invention. For example, in some embodiments the tolerance value may simply be set to the minimum tolerance value $T_{min}$ and additional iterations will be required to generate the rated flux value. In addition, the q-axis torque current value assumption need not converge as a function of the magnitude of the tolerance value $T_{tol}$. Moreover, where the q-axis torque value does converge as a function of the magnitude of the tolerance value, other converging algorithms are contemplated that trade off speed of convergence and potential overshoot of the most accurate estimation of the rated flux current value.

To apprise the public of the scope of this invention, the following claims are made.

What is claimed is:

1. A method for use with an adjustable frequency controller to deliver current to an electromagnetic load including a stator and a rotor, the method for identifying a flux current estimate and comprising the steps of:

(a) identifying a rated torque value;

(b) providing an initial q-axis current estimate;

(c) using the q-axis current estimate to identify a d-axis current estimate;

(d) mathematically combining the d-axis current estimate and the q-axis current estimate to identify a torque estimate;

(e) comparing the rated torque value to the torque estimate;

(f) where the torque estimate is similar to the rated torque value skipping to step (i);

(g) altering the q-axis current estimate;

(h) repeating steps (c) through (f); and (i) storing the d-axis and q-axis current estimates as flux and torque current values for subsequent use.

2. The method of claim 1 further including the step of identifying a minimum torque differential value that is less than the rated torque value and wherein the step of comparing includes determining that the torque estimate is similar to the rated torque value if the torque estimate is within the minimum torque differential value of the rated torque value.

3. The method of claim 1 further including the steps of identifying a minimum torque differential value that is less than the rated torque value and identifying an intermediate torque tolerance value that is a percentage of the rated torque value and is greater than the minimum torque differential value, the step of comparing including:

(i) identifying the difference between the rated torque value and the torque estimate as a difference value;

(ii) comparing the difference value to the intermediate torque tolerance value;

(iii) where the intermediate torque tolerance value is less than the difference value, skipping to step (g);

(iv) else comparing the intermediate torque tolerance value to the minimum torque differential value and, where the intermediate torque tolerance value is greater than the minimum differential torque value, reducing the intermediate torque tolerance value and skipping to step (g), else determining that the torque estimate is similar to the rated torque value.

4. The method of claim 3 wherein rated horse power and rated speed values are known and wherein the step of identifying a rated torque value includes the step of mathematically combining the rated horse power value and the rated speed value.

5. The method of claim 4 wherein a rated current value is provided and wherein the step of providing an initial q-axis current estimate includes the step of providing the rated current value as the initial estimate and the step of altering the q-axis current estimate includes the step of reducing the estimate.

6. The method of claim 5 wherein the step of reducing the q-axis current estimate includes the step of reducing the q-axis current estimate as a function of the magnitude of the torque tolerance value.

7. The method of claim 6 wherein the step of using the q-axis current estimate to identify a d-axis current estimate includes the step of mathematically combining the q-axis current estimate and the rated current value.

8. The method of claim 7 wherein the electromagnetic load includes P poles, a stator resistance value, a load leakage inductance value and a rated voltage value are known and wherein the step of mathematically combining to identify a torque estimate includes the steps of mathematically combining the stator resistance value, the d-axis current estimate, the rated speed, the leakage inductance value and the q-axis current value to identify a d-axis voltage estimate, mathematically combining the rated voltage value and the d-axis voltage estimate to identify a q-axis voltage estimate, mathematically combining the q-axis voltage estimate, the q-axis current estimate, the stator resistance value and the rated speed to identify a d-axis flux value and mathematically combining the number P of poles, the d-axis flux value, the q-axis current estimate, the leakage inductance value and the d-axis current estimate to provide the torque estimate.

9. The method of claim 1 wherein rated horse power and rated speed values are provided and wherein the step of identifying a rated torque value includes the step of mathematically combining the rated horse power value and the rated speed value.

10. The method of claim 1 wherein a rated current value is provided and wherein the step of providing an initial q-axis current estimate includes the step of providing the rated current value as the initial estimate and the step of altering the q-axis current estimate includes the step of reducing the q-axis current estimate.

11. The method of claim 1 wherein the step of using the q-axis current estimate to identify a d-axis current estimate includes the step of mathematically combining the q-axis current estimate and the rated current value.

12. The method of claim 11 wherein the step of mathematically combining the q-axis and rated current values includes taking the square root of the difference between the squared rated current value and the square of the q-axis current value.

13. The method of claim 1 wherein the electromagnetic load includes P poles and, wherein, a stator resistance value, a load leakage inductance value, a rated voltage value, a rated current value and a rated speed are known and wherein the step of mathematically combining to identify a torque estimate includes the steps of mathematically combining the stator resistance value, the d-axis current estimate, the rated speed, the leakage inductance value and the q-axis current value to identify a d-axis voltage estimate, mathematically combining the rated voltage value and the d-axis voltage estimate to identify a q-axis voltage estimate, mathematically combining the q-axis voltage estimate, the q-axis current estimate, the stator resistance value and the rated speed to identify a d-axis flux value and mathematically combining the number P of poles, the d-axis flux value, the q-axis current estimate, the leakage inductance value and the d-axis current estimate to provide the torque estimate.

14. A method for use with an adjustable frequency controller to deliver current to a P pole electromagnetic load including a stator and a rotor wherein a rated speed, a rated current value, a rated voltage value, a rated horse power, a leakage inductance value and a stator resistance value are known, the method for identifying a flux current estimate and comprising the steps of:

(a) mathematically combining the rated horse power and the rated speed to identify a rated torque value;

(b) providing an initial q-axis current estimate that is less than the rated current value;

(c) mathematically combining the q-axis current estimate and the rated current value to identify a d-axis current estimate;

(d) mathematically combining the d-axis current estimate, the q-axis current estimate, the stator resistance value, the leakage inductance value and the rated speed to identify a d-axis current value;

(e) mathematically combining the d-axis voltage value and the rated voltage value to identify a q-axis voltage value;

(f) mathematically combining the q-axis voltage value, the stator resistance value, the q-axis current value and the rated speed value to identify a d-axis flux value;

(g) mathematically combining the pole P number, the d-axis flux value, the q-axis current value, the d-axis current value and the leakage inductance value to identify a torque estimate;

(h) comparing the rated torque value to the torque estimate;

(i) where the torque estimate is similar to the rated torque value skipping to step (l);

(j) reducing the q-axis current estimate;

(k) repeating steps (c) through (i); and (l) storing the d-axis and q-axis current estimates as flux and torque current values for subsequent use.

15. The method of claim 14 further including the step of identifying a minimum torque differential value that is less than the rated torque value and wherein the step of comparing includes determining that the torque estimate is similar to the rated torque value if the torque estimate is within the minimum torque differential value of the rated torque value.

16. The method of claim 14 further including the steps of identifying a minimum torque differential value that is less than the rated torque value and identifying an intermediate torque tolerance value that is a percentage of the rated torque value and is greater than the minimum torque differential value, the step of comparing including:

(i) identifying the difference between the rated torque value and the torque estimate as a difference value;

(ii) comparing the difference value to the intermediate torque tolerance value;

(iii) where the intermediate torque tolerance value is less than the difference value, skipping to step (g);

(iv) else comparing the intermediate torque tolerance value to the minimum torque differential value and, where the intermediate torque tolerance value is greater than the minimum differential torque value, reducing the intermediate torque tolerance value and skipping to step (g), else determining that the torque estimate is similar to the rated torque value.

17. The method of claim 16 wherein the step of reducing the q-axis current estimate includes the step of reducing the q-axis current estimate as a function of the magnitude of the torque tolerance value.

18. An apparatus for use with an adjustable frequency controller to deliver current to an electromagnetic load including a stator and a rotor, the apparatus for identifying a flux current estimate and comprising:

a processor running a program for:
(a) identifying a rated torque value;
(b) receiving an initial q-axis current estimate;
(c) using the q-axis current estimate to identify a d-axis current estimate;
(d) mathematically combining the d-axis current estimate and the q-axis current estimate to identify a torque estimate;
(e) comparing the rated torque value to the torque estimate;
(f) where the torque estimate is similar to the rated torque value skipping to step (i);
(g) altering the q-axis current estimate;
(h) repeating steps (c) through (f); and
(i) storing the d-axis and q-axis current estimates as flux and torque current values for subsequent use.

19. The method of claim 18 wherein the processor also identifies a minimum torque differential value that is less than the rated torque value and identifies an intermediate torque tolerance value that is a percentage of the rated torque value and is greater than the minimum torque differential value, and that performs the step of comparing by:

(i) identifying the difference between the rated torque value and the torque estimate as a difference value;

(ii) comparing the difference value to the intermediate torque tolerance value;

(iii) where the intermediate torque tolerance value is less than the difference value, skipping to step (g);

(iv) else comparing the intermediate torque tolerance value to the minimum torque differential value and, where the intermediate torque tolerance value is greater than the minimum differential torque value, reducing the intermediate torque tolerance value and skipping to step (g), else determining that the torque estimate is similar to the rated torque value.

20. The apparatus of claim 19 wherein a rated current value is provided and wherein processor performs the step of receiving an initial q-axis current estimate by receiving an initial estimate that is less than the rated current value and the step of altering the q-axis current estimate by reducing the estimate.

21. The apparatus of claim 20 wherein the processor performs the step of reducing the q-axis current estimate by reducing the q-axis current estimate as a function of the magnitude of the tolerance value.

* * * * *